United States Patent [19]

Kobayashi

[11] 4,372,117
[45] Feb. 8, 1983

[54] BRAKE MASTER CYLINDER FOR MOTOR VEHICLES

[75] Inventor: Hideyuki Kobayashi, Toyota, Japan

[73] Assignee: Aisin Seiki Kabushiki Kaisha, Kariya, Japan

[21] Appl. No.: 192,202

[22] Filed: Sep. 30, 1980

[30] Foreign Application Priority Data

Oct. 8, 1979 [JP] Japan .............................. 54-129607

[51] Int. Cl.³ ............................................. B60T 11/20
[52] U.S. Cl. ....................................... 60/562; 60/578; 60/588
[58] Field of Search .................. 60/574, 578, 588, 562

[56] References Cited

U.S. PATENT DOCUMENTS

| 3,169,372 | 2/1965 | Rike | 60/588 |
|---|---|---|---|
| 3,199,299 | 8/1965 | Moyer | 60/588 |
| 4,086,770 | 5/1978 | Shaw | 60/574 |
| 4,128,249 | 12/1978 | Mantini | 60/578 |
| 4,133,178 | 1/1979 | Brooks | 60/578 |
| 4,170,386 | 10/1979 | Shutt | 60/574 |
| 4,208,881 | 6/1980 | Brademeyer | 60/588 |

*Primary Examiner*—Abraham Hershkovitz
*Attorney, Agent, or Firm*—Finnegan, Henderson, Farabow, Garrett & Dunner

[57] ABSTRACT

A split-type brake master cylinder for motor vehicles comprises a stepped bore, a stepped primary piston to constitute a first fluid chamber between a large diameter portion and a small diameter portion thereof, a secondary piston to form a primary pressure chamber in cooperation with the primary piston as well as a second fluid chamber in normal fluidic communication with a reservoir, and a compensation port continuously connected to the primary pressure chamber and in the fluidic connection to the second fluid chamber at the brake release condition while in the fluidic isolation therefrom at the brake application. Thus, the compensation port has no direct relationship with the pressure increase in the first fluid chamber thereby to assure the stable output pressure of the master cylinder regardless of the depression speed of brake pedal.

7 Claims, 2 Drawing Figures

BRAKE MASTER CYLINDER FOR MOTOR VEHICLES

BACKGROUND OF THE INVENTION

The present invention relates to a brake master cylinder for motor vehicles and more particularly to a split-type master cylinder in which dual brake fluid pressure is applied independently of each other to sets of wheel brake cylinders.

A brake master cylinder requires, as is well known, a relatively large volume of brake fluid at the initial stage of brake application and relatively high pressure at the subsequent stage thereof. For instance, in the brake master cylinder associated with disc brakes, the relatively large volume of brake fluid is necessary to bring the friction pads of the disc brakes to abutment to the rotor while the relatively high brake pressure is necessary to permit the friction pads to squeeze the rotor.

In order to satisfy such requirement of the brake master cylinder, it has been proposed to prepare a stepped bore of the cylinder in which a stepped piston is slidably fitted to define a fluid chamber between the large diameter portion of the stepped piston and the small diameter portion thereof so as to supply brake fluid to the wheel brake cylinders only at the initial stage of brake application.

According to the conventional split-type brake master cylinder, however, a compensation port for a primary pressure chamber is fluidically connected also to the fluid chamber described above. More specifically, it is a conventional practice to connect the compensation port for the primary pressure chamber formed between a primary piston and a secondary piston to the above-mentioned fluid chamber, thereby to permit normal fluidic communication of the fluid chamber with a brake fluid reservoir.

Therefore, the pressure in the fluid chamber is subject to variation in response to depression speed of brake pedal because of the compensation port with the results that the master cylinder pressure varies with the speed of depression the brake pedal.

SUMMARY OF THE INVENTION

It is, accordingly, one of the objects of the invention to provide a brake master cylinder for motor vehicles which will obviate the conventional drawbacks as mentioned above.

It is another object of the invention to provide a brake master cylinder which may not be affected by the depression speed of the brake pedal and will ensure the stable output pressure regardless thereof.

It is a further object of the invention to provide a brake master cylinder which provides a relatively large volume of brake fluid at the initial stage of brake application and a relatively high pressure at the subsequent stage thereof.

It is still another object of the invention to provide a brake master cylinder in which no residual pressure prevails after the brake release, even upon expansion or contraction of the brake fluid.

A split-type brake master cylinder according to the invention comprises a stepped primary piston defining a first fluid chamber, a secondary piston defining a second fluid chamber in normal fluidic communication with a reservoir, and a compensation port for a primary pressure chamber provided to be closed by the secondary, piston. The compensation port is in fluidic communication with the second fluid chamber at the brake release position and in fluidic isolation therefrom at the brake application.

These and other objects and features of the invention will be apparent from the following description in connection with the accompanying drawings.

DETAILED DESCRIPTION OF THE PREFERRED EMBODIMENT

Figure 1:
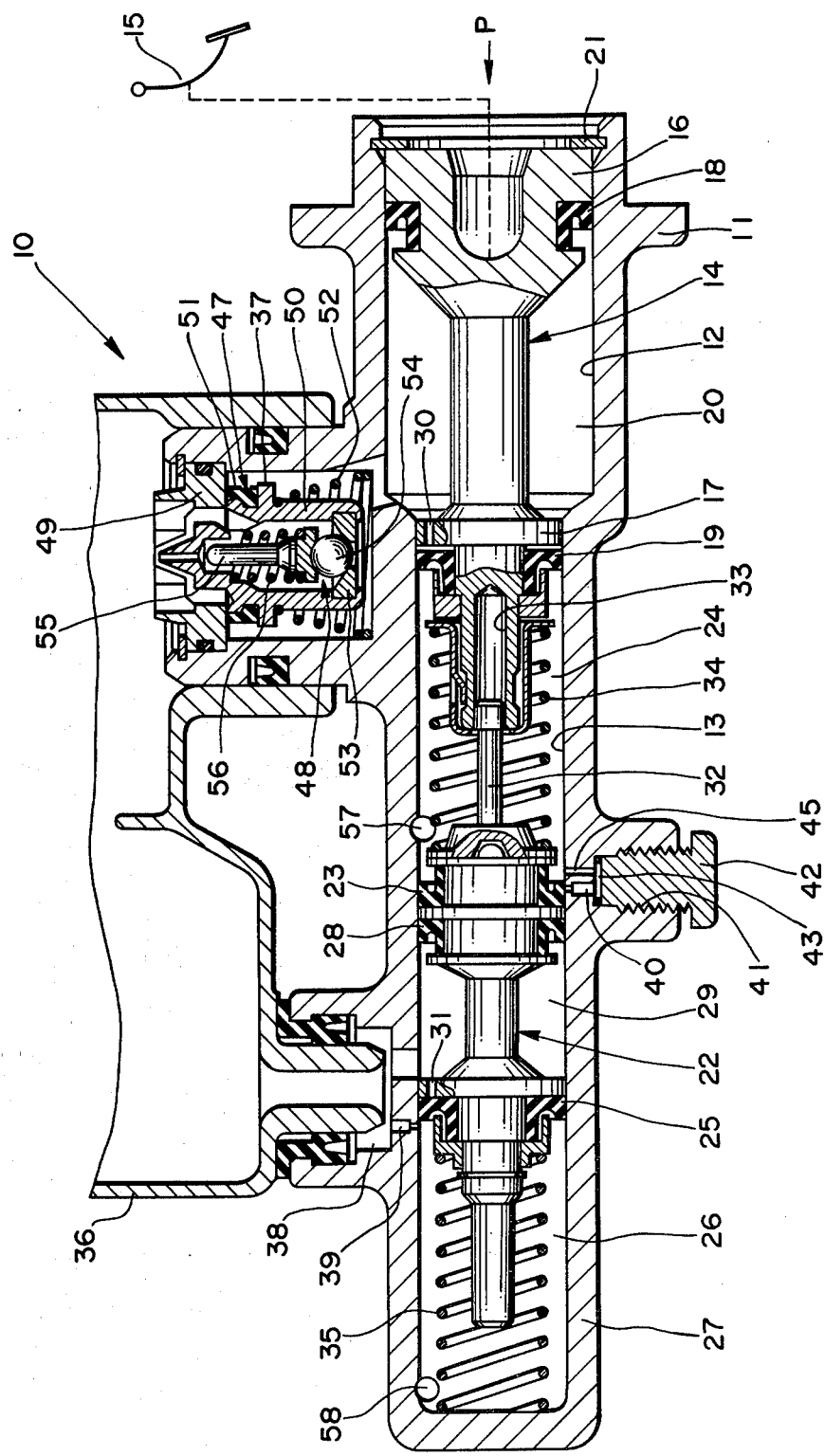
FIG. 1 is a longitudinal section of one embodiment of a brake master cylinder according to the invention.
Figure 2:
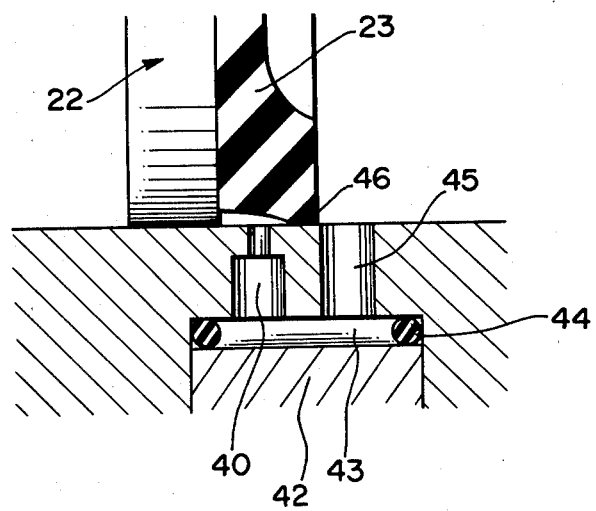
FIG. 2 is a fragmentary enlarged view of a part in FIG. 1.

With reference now to FIGS. 1 and 2, a split-type brake master cylinder 10 according to the invention includes a cylinder body 11 provided with a large diameter bore 12 and a small diameter bore 13 therein. A primary piston 14 to be actuated by a brake pedal 15 is formed with a large diameter portion 16 slidably fitted with the large diameter bore 12 and a small diameter portion 17 slidably fitted with the small diameter bore 13. Seal cups 18 and 19 are mounted on the large diameter portion 16 and the small diameter portion 17 respectively to thereby define a fluid chamber 20 therebetween. The retracted position of the primary piston 14 is limited by a snap ring retainer 21 carried on the cylinder body 11.

A secondary piston 22 in mechanical abutment with the primary piston 14 is slidably fitted in the small diameter bore 13 and provided with a seal cup 23 thereon to form a primary pressure chamber 24. The secondary piston 22 is also provided with another seal cup 25 to form a secondary pressure chamber 26 between the cup 25 and an end wall 27 of the cylinder body 11 and with a seal cup 28 to form a fluid chamber 29 between the cups 25 and 28.

The primary piston 14 is provided at the small diameter portion 17 with an axial hole 30 and the seal cup 19 allows fluid flow from the fluid chamber 20 to the primary pressure chamber 24 via the hole 30 due to pressure difference between the chambers 20 and 24. Similarly, the secondary piston 22 is provided with a hole 31 and the seal cup 25 allows fluid flow from the fluid chamber 29 to the secondary pressure chamber 26 via the hole 31 due to the pressure difference between the chambers 29 and 26.

A rod 32 is slidably mounted in an axial recess 33 of the primary piston 14 at one end thereof and mechanically abuts on the secondary piston 22, thereby limiting the maximum distance between the pistons 14 and 22 which are normally urged to move in opposite directions by a first compression coil spring 34 interposed therebetween. A second compression coil spring 35 of the smaller biasing force than the first spring 34 is disposed in the secondary pressure chamber 26 to urge the secondary piston 22 to move in the right direction in FIG. 1. The pistons 14 and 22 are located in the illustrated position by means of the compression coil springs 34 and 35.

The cylinder body 11 is connected to a reservoir shell 36 at a first opening 37 and a second opening 38 thereof, the first opening 37 being in normal fluid communication with the fluid chamber 20 while the second opening 38 being in normal fluid communication with the fluid chamber 29. The cylinder body 11 is further provided with a compensation port 39 for the secondary pressure chamber 26. The left movement of the secondary piston 22 will isolate the secondary pressure chamber 26 from the compensation port 39 by means of the seal cup 25.

A compensation port 40 is formed on the cylinder body 11 to cooperate with the seal cup 23. That is, the cylinder body 11 is provided with a third opening 41, at the opposite side of the first and second openings 37 and 38, in which a plug 42 is screw-threadedly mounted to form a passage 43 defined by O-ring seal 44 (FIG. 2). Thus, the compensation port 40 is in continuous communication with the primary pressure chamber 24 through the passage 43 and a radial hole 45. In the brake released position, as illustrated, a seal tip 46 of the cup 23 is located between the ports 40 and 45 so that the compensation port 40 is in fluid connection with fluid chamber 29. It is to be noted that the seal cup 28 permits the fluid flow from the right to the left in FIG. 1 and may be omitted in view of the principal function of the brake master cylinder. The compensation port 40 is isolated from the fluid chamber 29 only after the seal tip 46 passes the port 40 upon left movement of the secondary piston 22.

In the first opening 37 of the cylinder body 11 there are provided a one-way check valve 47 for permitting the fluid flow only to the fluid chamber 20 from the reservoir 36 and a relief valve 48 for limiting the maximum pressure in the fluid chamber 20 to a relatively low level. The check valve 47 comprises an annular seat 49 secured to the cylinder body 11, a movable cylindrical support 50 located beneath the seat 49, a rubber-made valve 51 fixed to the support 50 at the top end thereof, and a spring 52 for urging the support 50 upward to seat the valve 51 onto the annular seat 49. The relief valve 48 comprises a seat base 53 fixed to the bottom opening of the support 50, a ball 54 carried on the seat base 53, a guide projection 55 carried on the ball 54 and a spring 56 for urging the guide projection 54 downward to seat the ball 54 onto the seat base 53. The numerals 57 and 58 denote outlet ports fluidically connected to the slave or whell brake cylinders, not shown.

In operation, when the brake pedal 15 is depressed to move the primary piston 14 as well as the secondary piston 22 in the left direction, the compensating ports 40 and 39 are closed by the seal cups 23 and 25 respectively. The further advancement of the primary piston 14 causes the pressure increase in the fluid chamber 20 and the primary pressure chamber 24. The pressure increase in the primary pressure chamber 24 will further advance the secondary piston 22 to increase the pressure in the secondary pressure chamber 26. The pressure increase ratio in the fluid chamber 20 is greater than that in the primary pressure chamber 24 so that the fluid in the fluid chamber 20 will be admitted to the primary pressure chamber 24 through the hole 30 and the outer periphery of cup 19 then to the wheel brake cylinders through the outlet port 57.

When the pressure in the fluid chamber 20 exceeds the predetermined value after the initial stage of brake application, the ball 54 of the relief valve 48 is moved up against the spring 56 to allow the fluid in the fluid chamber 20 to flow into the reservoir 36. Thus, the pressure increase in the fluid chamber 20 is terminated. As a consequence, the force applied to the primary piston 14 may be utilized to further increase the pressure in the primary pressure chamber 24 as well as in the secondary pressure chamber 26, thereby accomplishing the brake application.

As will be understood from the foregoing description, the relatively large volume of brake fluid is applied to the wheel brake cylinders at the initial stage of brake application whilst the relatively high pressure is applied to the wheel brake cylinders at the subsequent stage thereof regardless of the depression speed of the brake pedal 15.

When the brake pedal 15 is released, the pistons 14 and 22 are moved in the right direction due to action of the springs 34 and 35. In case that the fluid chamber 20 be at the negative pressure the valve 51 of the one-way check valve 47 is released from the seat 49 to admit the fluid into the fluid chamber 20 from the reservoir 36. In case that the primary pressure chamber 24 or the secondary pressure chamber 26 be at the negative pressure, the fluid in the fluid chamber 20 is admitted to the primary pressure chamber 24 via the hole 30 and the seal cup 19 or the fluid in the fluid chamber 29 is admitted to the secondary pressure chamber 26 via the hole 31 and the seal cup 25.

While the pistons 14 and 22 are in the rest position as shown, the primary pressure chamber 24 is in fluid communication with the reservoir 36 through the hole 45, the passage 43, the compensation port 40, and the fluid chamber 29. The secondary pressure chamber 26 is also in fluid communication with the reservoir 36 through the compensation port 39. As a result, no residual pressure prevails in the primary and secondary pressure chambers 24 and 26 even upon the accidental expansion or contraction of the brake fluid.

Although the invention has been described with reference to one embodiment thereof, the spirit and scope of the invention should be construed in accordance with the Claims as follows:

What is claimed is:

1. A brake master cylinder for motor vehicles comprising in combination:
 a cylinder body provided with a large diameter bore and a small diameter bore therein,
 a stepped primary piston provided with a large diameter portion slidably fitted in said large diameter bore and a small diameter portion slidably fitted in said small diameter bore,
 a secondary piston slidably fitted in said small diameter bore and associated with said primary piston,
 a first fluid chamber defined between said large and small diameter portions of said primary piston,
 a primary pressure chamber defined between said small diameter portion of said primary piston and one end of said secondary piston,
 a secondary pressure chamber defined between said cylinder body and the other end of said secondary piston,
 a second fluid chamber defined between said one end of secondary piston and said other end thereof and being in continuous fluid communication with a reservoir, and
 compensation port means disposed in operative relationship with said secondary piston and in continuous fluid communication with said primary pressure chamber for providing fluid-flow communication between said primary pressure chamber and said second fluid chamber during brake release and for preventing fluid-flow communication between said primary pressure chamber and said second fluid chamber upon brake application.

2. A brake master cylinder for motor vehicles as claimed in claim 1 in which said small diameter portion of primary piston includes a hole to permit the fluid flow from said first fluid chamber to said primary pressure chamber therethrough when the pressure in said first fluid chamber is higher than that in said primary pressure chamber.

3. A brake master cylinder for motor vehicles as claimed in claim 1, further comprising a one-way check valve and a relief valve interposed between said reservoir and said first fluid chamber, said one-way check valve permitting the fluid flow only to said first fluid chamber from said reservoir and said relief valve defining the maximum pressure in said first fluid chamber to a relatively low value.

4. A brake master cylinder for motor vehicles as claimed in claim 3 in which said one-way check valve comprises a seat secured to said cylinder body, a cylindrical support, a valve securely mounted on said support, and a spring normally urging said support to seat said valve onto said seat, and said relief valve comprises a base seat fixed to said support, a ball, and a spring normally urging said ball to seat on said base seat.

5. A brake master cylinder for motor vehicles as claimed in claim 1 further comprising another compensation port continuously connected to said reservoir and controlled by said other end of secondary piston, said another compensation port being fluidically connected to said secondary pressure chamber during brake release.

6. The brake master cylinder for motor vehicles as in claim 1 wherein said compensation port means comprises a compensation port, a radial passage in continuous fluid communication with said primary pressure chamber and with said compensation port through a fluid communication chamber, and a seal cup means mounted on said secondary piston for permitting fluid flow between said compensation port and said second fluid chamber during brake release and for preventing fluid flow between said compensation port and said second fluid chamber upon brake application.

7. The brake master cylinder for motor vehicles as in claim 6 wherein said seal cup means comprises a seal cup mounted on one end of said secondary piston and including a seal tip disposed between said compensation port and said radial passage during brake release and disposed to obstruct fluid flow between said compensation port and said second fluid chamber upon brake application.

* * * * *